2,938,012

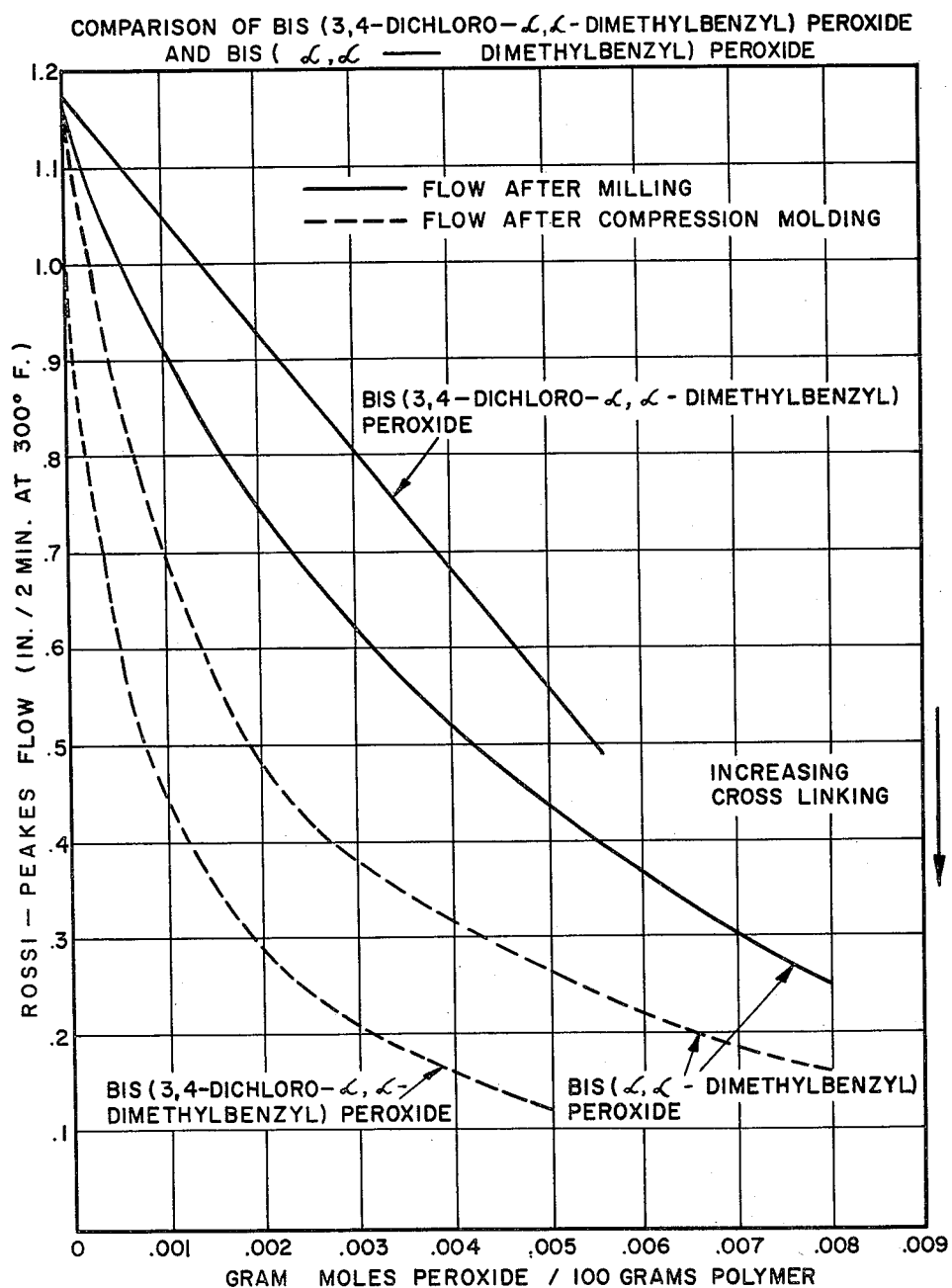

CROSS-LINKING OF ETHYLENE POLYMERS WITH PEROXIDE CATALYST AND COMPOSITION THEREFOR

Leo J. Filar, Newark, Del., assignor to Hercules Powder Company, Wilmington, Del., a corporation of Delaware Filed Mar. 7, 1958, Ser. No. 719,821

5 Claims. (Cl. 260—41)

The present invention relates to a process for improving the physical properties of normally solid polymers of ethylene.

Solid homopolymers of ethylene, as well as copolymers of ethylene with other monomers such as propylene, are known to the art. While both the homopolymers and copolymers of ethylene have many valuable properties which render them useful in a variety of applications, there have been numerous attempts by the art to improve their properties by various methods. It is known, for instance, that such polymers can be cross-linked by free radical catalysis to lower the degree of thermoplasticity and improve solvent resistance. Additionally, when such cross-linking is carried out in the presence of certain fillers, such as carbon black, considerable reinforcement of the polymers results.

More specifically, it is known that certain organic peroxides are effective cross-linking agents for normally solid polymers of ethylene and copolymers of ethylene and propylene. In many instances, the peroxides known to be useful for this purpose can be employed satisfactorily in conventional processing equipment and the cross-linked polymers obtained exhibit satisfactory properties. In other instances, however, the employment of peroxides as cross-linking agents for such polymers leads to a difficulty in processing that is caused by premature cross-linking, particularly when it is desirable to employ a high temperature in blending the polymer with the peroxide.

In accordance with the present invention, it has been found that bis(3,4-dichloro-$\alpha,\alpha$-dimethylbenzyl) peroxide is advantageously employed as a cross-linking agent for normally solid polymers of ethylene and copolymers of ethylene and propylene, specifically the advantages to be derived from its use including a reduced tendency to cause premature cross-linking during its incorporation into the polymer and a higher cross-linking efficiency. In practical terms, the present invention comprises heating a normally solid polymer selected from the group consisting of polyethylene and copolymers of ethylene and propylene in the presence of a minor amount of bis-(3,4-dichloro-$\alpha,\alpha$-dimethylbenzyl) peroxide to a temperature at which cross-linking takes place.

The following examples are presented to illustrate the invention. Parts and percentages are by weight unless otherwise specified. The molecular weight of the copolymers employed in the examples is shown by the reduced specific viscosity (RSV) given for each. By the term "reduced specific viscosity" is meant the specific viscosity, corrected to zero shear gradient, divided by the concentration of the solution in grams per 100 milliliters, measured at 135° C., on a solution in decalin containing 0.1 gram of the copolymer in 100 milliliters of the solution.

Example 1

Bis(3,4-dichloro-$\alpha,\alpha$-dimethylbenzyl) peroxide and medium thermal carbon black were incorporated into linear, high-density polyethylene having an RSV of 2.3 by milling the polymer on a two-roll mill heated to a temperature of 280° F. and adding first the carbon black and then the peroxide, and continuing the milling for 15 minutes after the addition of the peroxide. At this point, the Rossi-Peakes flow for 2 minutes at 300° F. and 100 p.s.i. (ASTM D569–48 Method B) was measured on the milled composition to determine if premature cross-linking had taken place to any extent. The milled batch was then extruded at 500° F. in a one-inch NRM extruder and a portion of the extrudate was compression molded at 350° F. for 15 minutes in a mold having a cavity 0.75 x 6 x 6 inches. The Rossi-Peakes flow of the molded piece was then determined for 2 minutes at 150° C. and 100 p.s.i. to determine qualitatively the extent of cross-linking which had taken place.

Following the above procedure, several additional experiments were carried out using different concentrations of bis(3,4-dichloro-$\alpha,\alpha$-dimethylbenzyl) peroxide and, for comparative purposes, equivalent molar amounts of bis($\alpha,\alpha$-dimethylbenzyl) peroxide. In all cases, the amount of carbon black was 50 parts per 100 parts of polyethylene.

The results of the above experiments are illustrated graphically in the single figure on which is plotted the peroxide concentration vs. Rossi-Peakes flow as measured immediately after milling and after final cure. It is easily seen from the graph that those compositions containing bis(3,4-dichloro-$\alpha,\alpha$-dimethylbenzyl) peroxide underwent premature cross-linking to a much lesser extent than the compositions containing bis($\alpha,\alpha$-dimethylbenzyl) peroxide but that after final cure the compositions containing bis-(3,4-dichloro-$\alpha,\alpha$-dimethylbenzyl) peroxide were cross-linked to a considerably greater extent than the compositions containing the bis($\alpha,\alpha$-dimethylbenzyl) peroxide.

Example 2

In this experiment the same polyethylene described in Example 1 was blended on a two-roll mill with 1% of bis(3,4-dichloro-$\alpha,\alpha$-dimethylbenzyl) peroxide at a temperature of 285° F. with no evidence of premature cross-linking during milling being observed. The resulting blend was compression molded 15 minutes at 350° F. in a mold having a cavity of 0.75 x 6 x 6 inches. The Rossi-Peakes flow of the molded specimen measured at 300° F. and 100 p.s.i. was only 0.15 inch per two minutes compared to 1.54 inches per two minutes for the same polyethylene in the uncross-linked state. This low flow value indicates the high degree of cross-linking in the final product.

Example 3

The polymer employed in this example was an amorphous copolymer of ethylene and propylene having an RSV of 4.5 which had been prepared by the copolymerization of equimolar proportions of ethylene and propylene in n-heptane at atmospheric pressure in the presence of a catalyst comprising a mixture of aluminum triisobutyl and a hydrocarbon-insoluble reaction product of titanium tetrachloride and aluminum sesquichloride.

100 parts of the copolymer were blended with 6% of bis(3,4-dichloro-$\alpha,\alpha$-dimethylbenzyl) peroxide on an unheated two-roll mill for 15 minutes. The milled composition was then cured by compression molding at 320° F. for 30 minutes in a mold having a cavity of 0.75 x 6 x 6 inches.

To demonstrate the degree of cross-linking that had taken place, a 100 milligram pellet of the molded composition was placed in 30 milliliters of toluene in a closed bottle and allowed to stand at 60° C. for 4 hours. The swollen pellet was then removed and carefully dried. None of it had dissolved in the toluene, whereas in the original state 100% of the copolymer dissolved in toluene under the same conditions.

The compound, bis(3,4-dichloro-α,α-dimethylbenzyl) peroxide, employed as a cross-linking agent in this invention can be prepared by reacting 3,4-dichlorocumene hydroperoxide and 3,4-dichloro-α,α-dimethylbenzyl alcohol in the presence of an acid-acting condensation catalyst as described in copending application, Serial No. 719,753, filed even date herewith by the present applicant, and now abandoned.

The normally solid polymers of ethylene and copolymers of ethylene and propylene which are treated in accordance with the invention are materials well known in the art and include both high-density and low-density varieties of polyethylene and amorphous copolymers of ethylene and propylene that contain up to about 70 mole percent of propylene.

The process of the invention is characterized by heating the polymer in the presence of bis(3,4-dichloro-α,α-dimethylbenzyl) peroxide and, optionally, also in the presence of other materials such as fillers, pigments, dyes, antioxidants, etc. The amount of peroxide to be employed can vary over a wide range but generally an amount from about 0.1 to 20% based on the weight of polymer will be employed with the optimum amount (which depends on the nature of the polymer, the results desired, the nature of other ingredients present, etc.) generally lying between about 0.1 and 10% by weight of the polymer.

In a preferred embodiment, carbon black is employed as a filler in practicing the invention and the amount of carbon black so employed can range from about 10% by weight of the polymer up to the maximum amount that can be blended conveniently on conventional equipment, a practical maximum being about three times the weight of polymer. In this preferred embodiment, the polymer is altered not only by cross-linking brought about by the peroxide but also by reinforcement via chemical interaction with the carbon black which is promoted also by the peroxide.

From the standpoint of manipulative procedure, there are many ways in which the invention can be practiced. For instance, blends of the peroxide and polymer, and other materials if such are employed, can be prepared by milling or by extrusion or by any other known method of similar nature. In some instances, it may be sufficient simply to incorporate the peroxide with the polymer by slurrying the latter in the form of small particles in a solution of the peroxide and then evaporating the solvent whereby the particles of polymer become coated with the peroxide.

The temperature to which the mixture of polymer and peroxide must be heated in order to bring about cross-linking is fairly widely variable but the optimum temperature will generally lie in the range of about 270–550° F., more often within the range of about 300–450° F. The time required to effect cross-linking, of course, varies with temperature, the lower the temperature the longer the time required. Optimum results can generally be obtained by heating at the prescribed temperature for from about 2–100 minutes, depending on the exact temperature employed and the concentration of peroxide.

What I claim and desire to protect by Letters Patent is:

1. The process of cross-linking a normally solid polymer selected from the group consisting of polyethylene and copolymers of ethylene and propylene which comprises heating said polymer in the presence of bis(3,4-dichloro-α,α-dimethylbenzyl) peroxide to a temperature ranging from about 270 to 550° F., the amount of said peroxide being from about 0.1 to 20% by weight of the polymer.

2. The process of claim 1 in which carbon black is present as a filler for the polymer.

3. The process of claim 1 in which the polymer is polyethylene.

4. The process of claim 1 in which the polymer is a copolymer of ethylene and propylene.

5. A composition comprising a normally solid polymer selected from the group consisting of polyethylene and copolymers of ethylene and propylene and bis(3,4-dichloro-α,α-dimethylbenzyl) peroxide, the amount of said peroxide being from about 0.1 to 20% by weight of the polymer.

References Cited in the file of this patent

UNITED STATES PATENTS

| | | |
|---|---|---|
| 2,501,966 | Rust et al. | Mar. 28, 1950 |
| 2,522,016 | Denison et al. | Sept. 12, 1950 |
| 2,826,570 | Ivett | Mar. 11, 1958 |